United States Patent [19]

Sussman

[11] Patent Number: 5,031,358
[45] Date of Patent: Jul. 16, 1991

[54] PORTABLE PLANT HUSBANDRY SYSTEM

[76] Inventor: Lester Sussman, 2301 Jefferson Davis Hwy., #531, Arlington, Va. 22202

[21] Appl. No.: 419,504

[22] Filed: Oct. 10, 1989

[51] Int. Cl.$^5$ ............................................. A01B 79/00
[52] U.S. Cl. ............................................. 47/58; 47/17
[58] Field of Search ...................................... 47/58, 17

[56] References Cited

U.S. PATENT DOCUMENTS

| | | | |
|---|---|---|---|
| 4,015,366 | 4/1977 | Hall | 47/1.01 |
| 4,396,872 | 8/1983 | Nutter | 47/17 |
| 4,430,828 | 2/1984 | Oglevee | 47/17 |
| 4,669,217 | 6/1987 | Fraze | 47/64 |
| 4,755,942 | 7/1988 | Gardner | 47/1.01 |
| 4,831,562 | 5/1989 | McIntosh | 364/413.02 |
| 4,934,096 | 6/1990 | Bentvelsen | 47/79 |

Primary Examiner—Henry E. Raduazo

[57] ABSTRACT

Many people have indoor plants in their homes, often of a variety of species. Each plant species requires specific climatic conditions for luxuriant growth. Such requirements include the correct amount of light, water, heat, air and nutrients. All these factors are important in the plants' biological processes of photosynthesis, respiration and transpiration.

Currently most people simply guess when a plant needs watering and fertilization. Some commercial products are available on the market to measure soil humidity, air temperature and light. These devices do not provide an integrated electronic plant husbandry system as proposed by this invention.

The invention aims at electronically monitoring the indoor plants' environment and via a preprogrammed, plant husbandry program, which contains the required values for proper specific plant species growth, will inform the user of the next required watering for each different plant, the amount of required water and whether or not the current plant's dosage of light and heat is correct for optimum growth. It will also notify the user when fertilizer should be added.

13 Claims, 7 Drawing Sheets

PORTABLE PLANT HUSBANDRY SYSTEM

BACKGROUND

Many people have indoor plants in their homes, often of a variety of species. Each plant species requires specific climatic conditions for luxuriant growth. Such requirements include the correct amount of light, water, heat, air and nutrients. All these factors are important in the plants' biological processes of photosynthesis, respiration and transpiration.

Photosynthesis is dependent upon carbon dioxide in the air, mineral elements in the soil, water and light. Different plant species have varying requirements for light, depending on the natural sunlight conditions in their countries of origin. Indoors the quantity and quality of light varies in different parts of the same room. Light intensity drops rapidly away from windows. This decrease is too sensitive for the human eye to detect. The amount of light entering a room depends on a number of factors. The size and number of windows are important, but so is the season of the year, the direction that the room faces and other factors such as trees and buildings outside of the window/s. If the position chosen for a plant to grow in is incorrect, adult leaves gradually turn yellow whilst the younger ones remain small and pale. A photoelectric cell is suitable to detect these varying lighting conditions.

Transpiration is regulated by the opening and closing of the stomata of the plants' leaves. The stomata are used in all of the plants' biological processes, to absorb carbon dioxide during photosynthesis and oxygen during respiration. The opening mechanism of the stomata is closely tied to the amount of humidity in the air. If the air is too dry, the plant loses excessive water during transpiration and would therefore need to be watered more regularly than if the humidity level was optimum for the plant. If the humidity is too high, then the plants' stomata will not open sufficiently to absorb oxygen or carbon dioxide. Generally the humidity for indoor plants should remain above 55-60%. This figure naturally varies for different plant species. For example plants with light, soft foliage, such as the maidenhead fern, higher humidity is required, whilst conversely plants with thicker, leathery leaves prefer lower humidity, such as the urn plant. A hygrometer is therefore essential to assure successful plant growth.

Heat as mentioned previously is also an important factor in a plant's growth. Each plant species has optimum temperatures for each phase of its growth, but it also has a biological maximum and minimum temperature. Above or below these temperatures all the metabolic processes of the plant cease. The ideal temperature for most plant growth is approximately 64-75 Farenheiht. The variation between night and day temperatures should not exceed more than 7-9 Farenheight. Greater variations soon damage the plant causing flowers and leaves to fall and foliage to yellow. A thermometer that records the daily maximum and minimum temperatures is important to determining the correct microclimate for a plant.

Watering a plant, which includes the quantity of water in a single watering period as well the frequency of the watering periods, depends upon the microclimate that is created indoors. The microclimate conditions have already been discussed above under light, heat and humidity. Too little water and the plant wilts, but too much water is even worse for a plant because the air in the soil is driven out and consequently the roots suffocate. Correct control of the water content in the plant's soil is essential to the healthy growth of the plant.

Nutrients are also essential to plant growth. A close relation exists between water and nutrients because the roots absorb the plant's food from water. Chemicals essential to the balanced development of plants are nitrogen, phosphorus and potassium.

Other trace elements are also needed. The periodicity and quantity of applying these chemicals vary from one plant species to another. For example the papyrus plant needs to be fertilized every four weeks, whilst the silk oak requires fertilization every two weeks.

Currently most people simply guess when a plant needs watering and fertilization. Some commercial products are available on the market to measure soil humidity, air temperature and light. For example the "Instamatic duo light/water tester" marketed by AMI Medical Electronics, Inc. of Ronkonkoma N.Y. This is an analog handheld device that gives the user a simple meter reading of the soil moisture and light currently available to a plant being tested. The device does not provide an integrated electronic plant husbandry system, as proposed by this invention, that measures all the plant's microclimatic parameters over a period of time and consequently provides the user with an automated notification of a specific plant's required microclimatic conditions, as set out in the above discussion.

This invention aims at electronically monitoring the indoor plants' environment and via a preprogrammed, husbandry program, which contains the required values for proper specific plant species growth, will inform the user of the next required watering for each different plant, the amount of required water and whether or not the current plant's dosage of light and heat is sufficient. It will also notify the user when fertilizer should be added.

OBJECTIVES OF THE INVENTION

Accordingly it is the objective of the present invention to provide an integrated portable indoor plant husbandry system, which monitors a given plant's environmental parameters allowing optimization of the said plant's growth, based on a set of predetermined growth parameters.

It is a further objective of the present invention to provide the means to input and identify a user selected plant species that needs to be monitored.

It is a further objective of the present invention to provide the means to monitor the following environmental parameters of a user selected plant;
 (a) daily sunlight intensity and dosage,
 (b) minimum, maximum and average daily air temperature,
 (c) average air humidity,
 (d) average soil moisture content and
 (e) soil nutrients.

It is a further objective of the present invention to provide the means to input and store the above environmental plant parameters into the said invention.

It is a further objective of the present invention to provide the means to store predetermined optimum values of the above mentioned plant environmental parameters, per user required plant species.

It is a further objective of the present invention to provide the means to correlate the monitored environmental plant parameters with the stored optimum plant environmental parameters.

It is a further objective of the present invention to provide the means to inform the user of the following plant husbandry parameter changes, required for optimum plant growth;
  (a) the current plant's sunlight dosage,
  (b) when the next watering of the plant is, as well as the required quantity of water and
  (c) when the next nutrient feeding of the plant is, as well as the required quantity of nutrients for optimum growth.

It is a further objective of the present invention to provide the means for the user to set a time and day in the week to attend collectively to the all the identified plants' needs.

BRIEF DESCRIPTION OF THE DRAWINGS

For further understanding of the present invention and for further objects and advantages thereof, reference is now made to the following description taken in conjunction with the accompanying drawings showing an embodiment of the present invention, in which.

DETAILED DESCRIPTION OF THE INVENTION

Figure 1A:
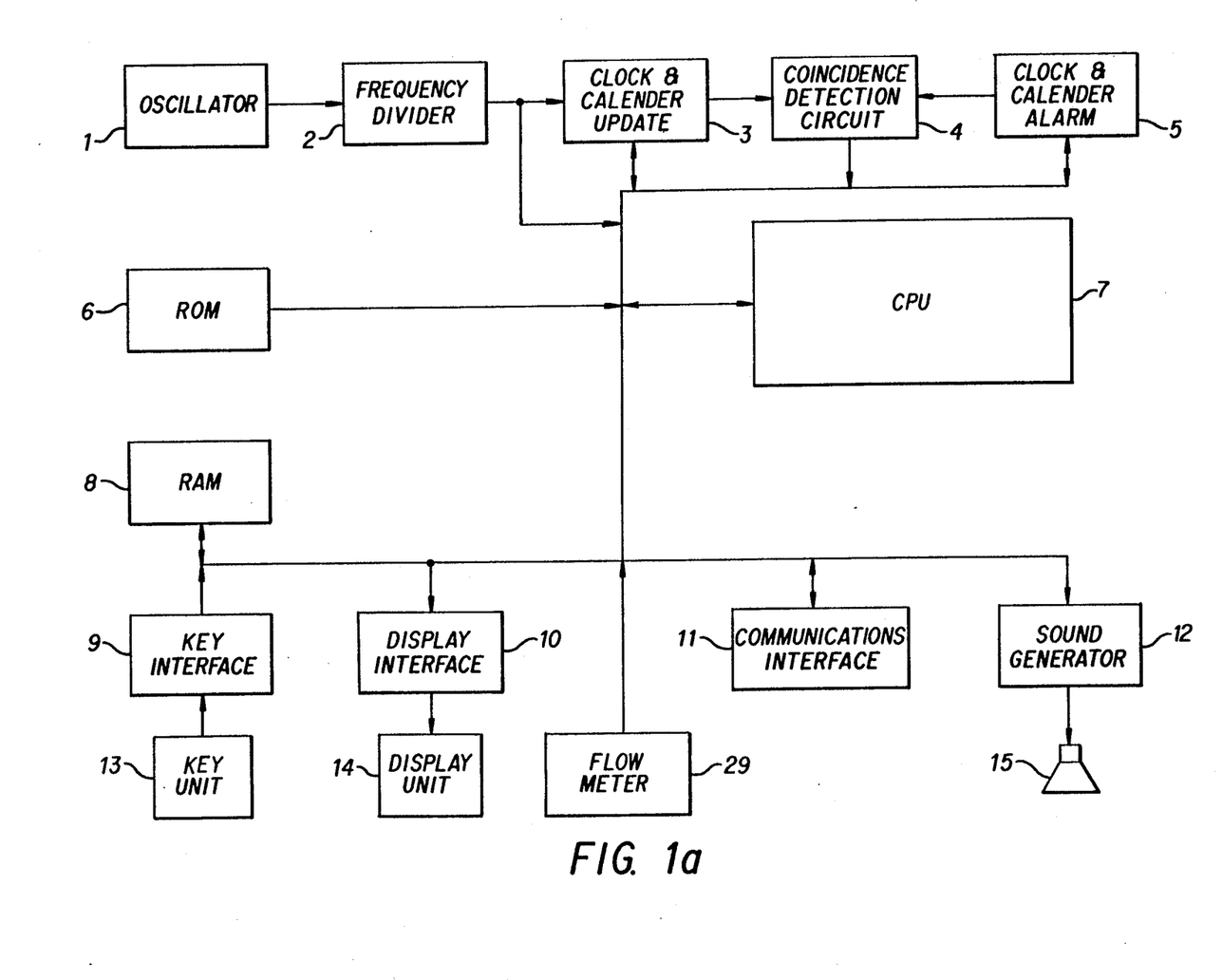
FIG. 1a is a block diagram of the primary circuit of an embodiment of the present invention.

FIG. 1a is a block diagram of a principal circuit for implementing the present invention. The circuit comprises of a circuit oscillator 1, a frequency divider 2, a time keeping counter with calender functions 3, an alarm coincidence detection circuit 4, clock and calender alarm memory 5, read only memory ROM 6, a controller CPU 7, random access memory RAM 8, a keypad interface circuit 9, a keypad unit 13, a display interface circuit 10, a display unit 14, a communications interface circuit 11, a sound generating circuit 12, speaker 15 and a flow meter 29.

The oscillator circuit 1 is coupled to a crystal oscillator, that is not shown, for generating a time base signal in the form of clock pulses of the crystal oscillator's frequency (for example 32.768 kHz). The frequency divider 2 is responsive to the clock pulses for frequency dividing of the said frequency to a specific frequency that is applied to the controller CPU 7 and lastly divided to 1 Hz, which is applied to the time keeping counter 3.

The counter 3 provides the present invention with all time and calender functionality. The 1 Hz frequency generated from the frequency divider 2, generates a signal to maintain the current time in seconds, minutes and hours, as well as current calender data such as the day of the month and year. This horological data is available to the controller CPU 7 and to the display interface circuit 10.

The clock and calender alarm circuit 5 contains the user defined alarm time and date information, which is entered into the present invention by means of the keypad 13. The clock and calender alarm circuit 5 has an associated coincidence detection circuit 4, which determines the equivalency between the alarm time and date stored in the clock and calender alarm 5, and the current time and date as maintained in the clock and calender update circuit 3. When an alarm equivalency is detected, the coincidence detection circuit 4 generates a clock and calender alarm active signal, which is transmitted to the CPU 7.

ROM 6 contains all programs that the CPU 7 uses to interface with all of the present invention's circuit modules 1 through 6 and 8 through 15 and 29. ROM 6 also contains all the programs required to enter, store, retrieve, edit and delete all user definable data in RAM 8. ROM 6 also contains programs to send plant monitored data between the present invention and the remote data acquisition device, FIG. 1b, via the communications interface 11. Furthermore ROM 6 also contains all non-volatile system messages, (for example, functional menus and error messages), that are to be displayed via the display interface circuit 10 and the display unit 14 (FIGS. 7a through 7f).

The keypad interface circuit 9 receives an output from a user selected key on the keypad 13, delivers its corresponding coded key output, senses the meaning of the key output and develops an output representative of its results, that is interpreted by the CPU 7.

The display interface 10 controls the display unit 14 by means of data received from the CPU 7. The display unit 14 could be any form of display that present technology avails, for example LCD or LED displays. Because of the relatively low power consumption of the present day LCD technology, this said form of display unit is used by way of preference in the embodiment of the present invention.

Figure 1B:
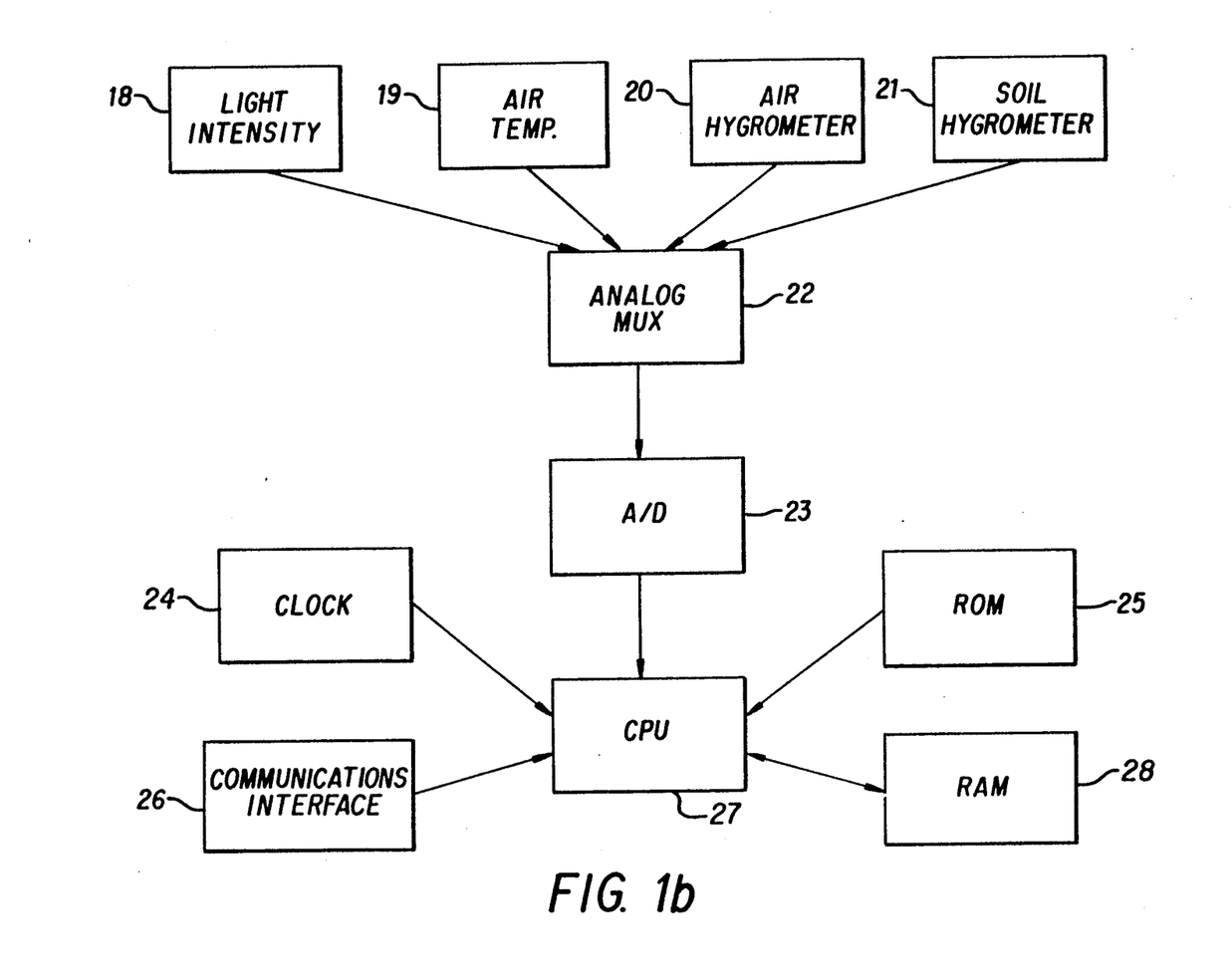
FIG. 1b is a block diagram of the secondary circuit, of an embodiment of the present invention, the remote data acquisition device that measures a plant's environmental parameters.

The communications interface 11 allows unidirectional transfer of information between the present invention and the remote data acquisition device (FIG. 1b). This said circuit establishes and breaks the communications link and maintains the integrity of the data transferred between the remote data acquisition device and the invention's primary circuit's RAM 8. The technology used to implement the said circuit could be anything that current technology avails, for example RS-232C or GPIB interface protocols. With very little additional effort, it is obvious that the communications interface 11 can be bi-directional. This dual data path could be used, for example, to upload and download data between the present invention and a remote computer, or it could be used to send formatted data to a printer.

The flow meter 29 is used to measure the amount of water that the user applies to a selected plant. When the invention's determined periodic amount of water has been applied to the plant under care, the present embodiment emits an audible frequency, via the sound generator 12, on the speaker 15.

FIG. 1b is a block diagram of a secondary circuit for implementing the present invention's remote data acquisition device. The circuit comprises of a photoelectric cell 18, an air thermometer 19, an air hygrometer 20, a soil hygrometer 21, an analog multiplexer 22, an analog to digital converter 23, a clock 24, read only memory ROM 25, a communications interface circuit 26, a controller CPU 27 and random access memory RAM 28.

The photoelectric cell 18 is used to measure the light intensity that falls on the plant being measured for microclimatic growth conditions. This measuring device has an analog voltage output, which is converted into digital format by the analog to digital converter 23. This digital data is then stored in the RAM 28 to be transmitted on demand to the invention's primary circuit as described in FIG. 1a.

The air thermometer 19 is used to measure the temperature of the air immediately surrounding the plant under measurement. This measuring device has an analog voltage output, which is converted into digital format by the analog to digital converter 23. This digital data is then stored in the RAM 28 to be transmitted on demand to the invention's primary circuit as described in FIG. 1a.

The hygrometer 20 is used to measure the moisture content of the air immediately surrounding the plant under measurement. This measuring device has an analog voltage output, which is converted into digital format by the analog to digital converter 23. This digital data is then stored in the RAM 28 to be transmitted on demand to the invention's primary circuit as described in FIG. 1a.

The hygrometer 21 is used to measure the moisture content of the soil in which the plant under measurement, is planted. This measuring device has an analog voltage output, which is converted into digital format by the analog to digital converter 23. This digital data is then stored in the RAM 28 to be transmitted on demand to the invention's primary circuit as described in FIG. 1a.

The analog multiplexer 22 multiplexes all of the above mentioned analog measuring devices (18, 19, 20 and 21). The secondary circuit's CPU 27 controls the analog mux 22, enabling the CPU 27 to individually read in all of the plant's measurement parameters and to store their digitally converted values in RAM 28.

The analog to digital converter 23 converts into a digital word each of the secondary circuit's analog data acquisition devices' readings (18, 19, 20 and 21).

The clock 24 circuit generates all time base signals for the secondary circuit of the invention. The time base signals generated include the clock pulses necessary to drive all the electronic circuitry in FIG. 1b, as well as time signals needed to measure a 24 hour day. The latter time signal is used by the CPU 27 to periodically sample all of the plant's measurement parameters via the analog mux 22. The current invention's sampling period is hourly. The hourly readings enable the primary circuit in FIG. 1a to determine the maximum, minimum and average values for the various plant growth parameters. These values in turn are used to advise the user of the current plant's recommended optimum growth environment.

The communications interface 26 allows unidirectional transfer of data between the present invention and the current invention's primary circuit device (FIG. 1a). This said circuit establishes and breaks the communications link and maintains the integrity of the data transferred between the remote data acquisition device's RAM 28 and the invention's primary circuit. The technology used to implement the said circuit could be anything that current technology avails, for example RS-232C or GPIB interface protocols.

ROM 25 contains all programs that the CPU 27 uses to interface with all of the present invention's secondary circuit modules 18 through 23 and 26 and 28. ROM 25 also contains the program to send measurement information between the invention's secondary (FIG. 1b) and primary (FIG. 1a) circuits. RAM 28 is used to dynamically store all of the inputted, digitally converted values of all of the plant's measured growth parameters.

Figure 2:
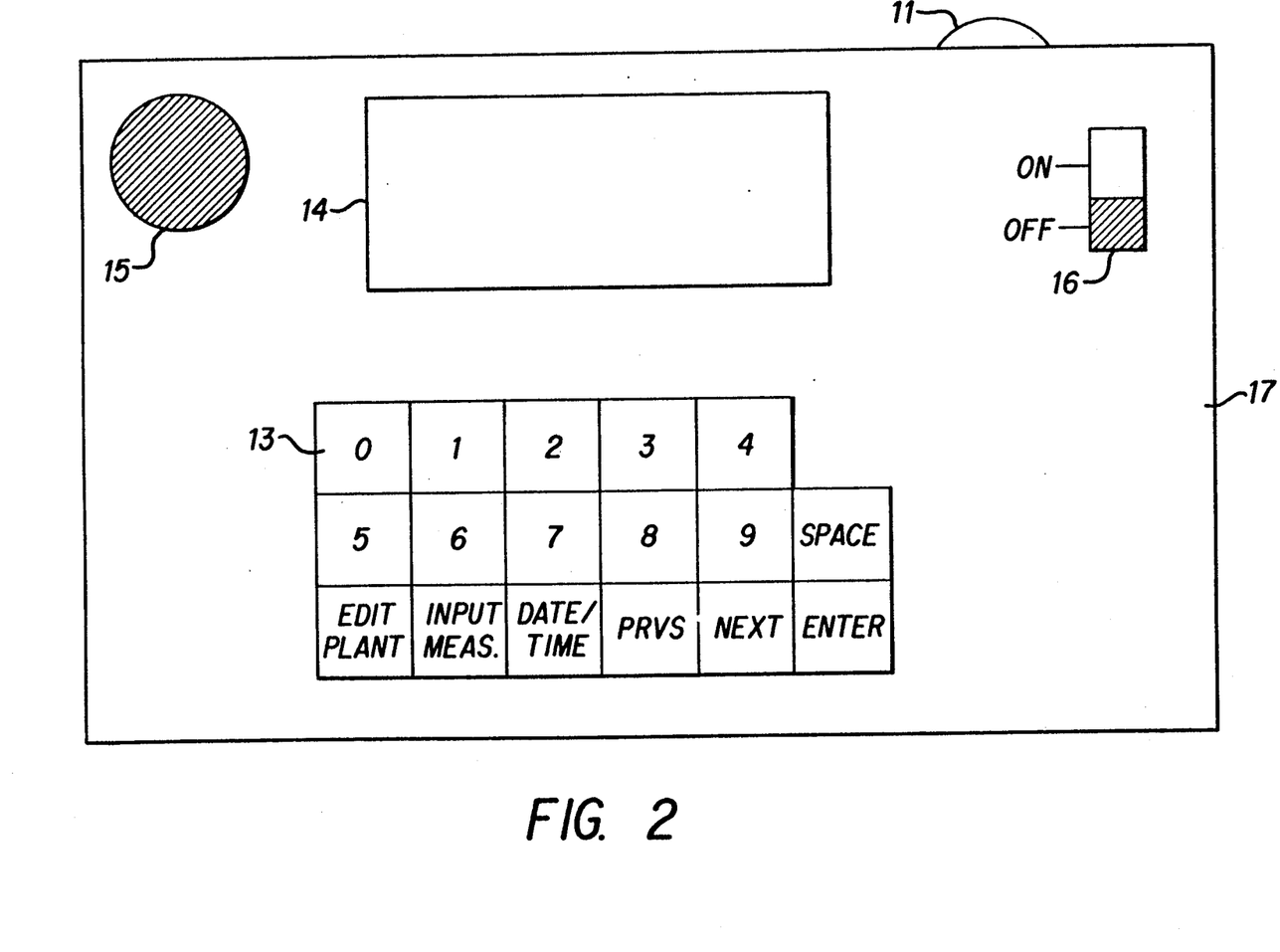
FIG. 2 is a plan view of the perspective of the primary circuit illustrated embodiment.

FIG. 2 is a plan view showing the perspective of the illustrated embodiment's primary circuit 17, which includes the keypad 13, the display panel 14, the communications interface 11, the speaker 15 and the mode selector switch 16, which is a simple on/off switch. The on position allows the user to interact with the primary circuit 17 via the keypad 13 and display panel 14.

Figure 3:
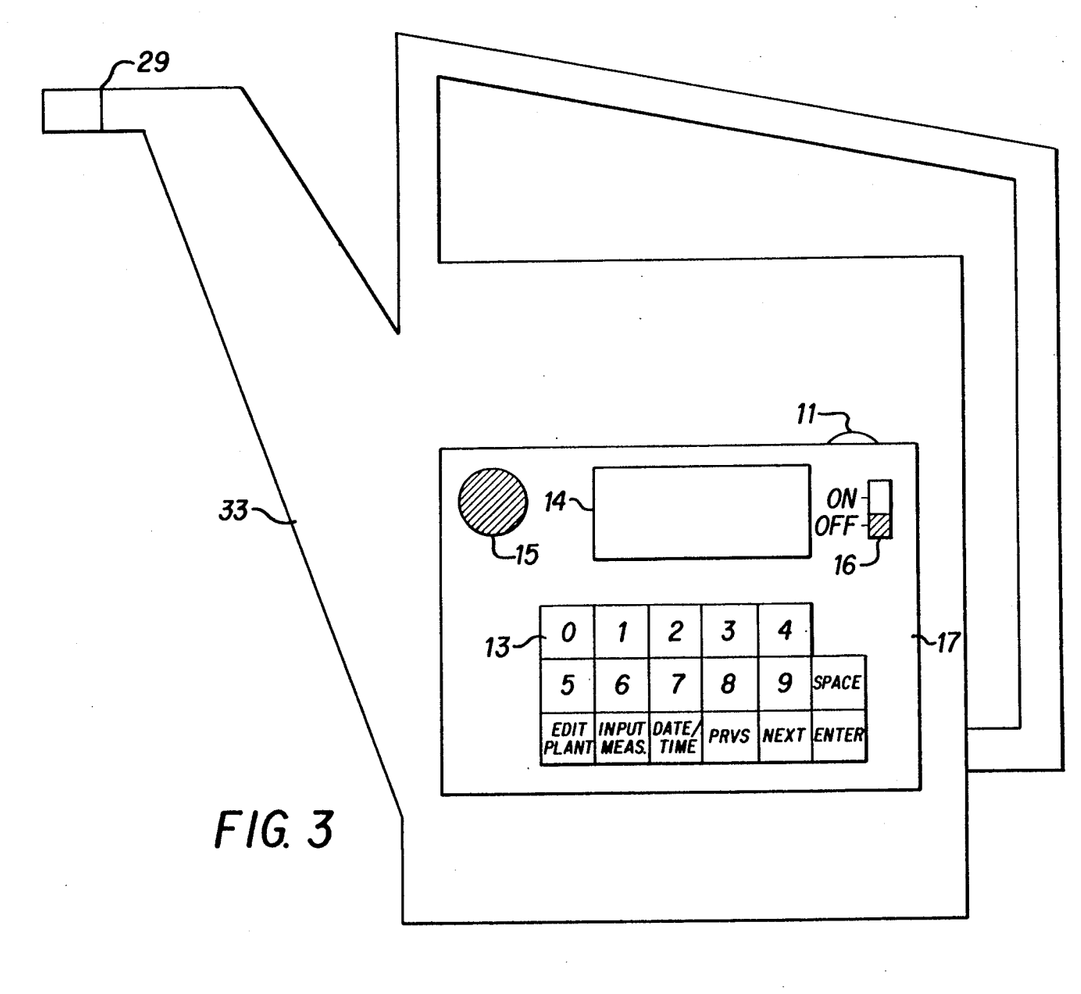
FIG. 3 is a side elevation of the primary circuit installed on a portable watering device of an embodiment of the present invention.

FIG. 3 is a side view showing the perspective of the illustrated embodiment of the primary circuit 17 embedded in a portable watering system 33. Also shown in this figure is the flow meter 29 used to measure the amount of water that the user applies to a selected plant.

Figure 4:
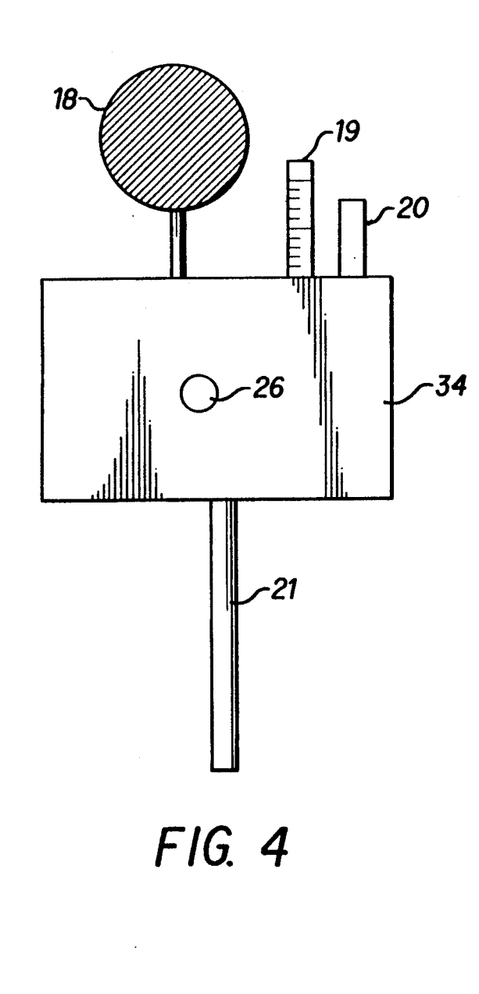
FIG. 4 is a side elevation of the secondary circuit of an embodiment of the present invention, such that it can be installed to monitor various plant growth parameters.

FIG. 4 is a side view showing the perspective of the illustrated embodiment of the secondary circuit embedded in a portable data acquisition device 34, which includes the external photoelectric cell 18, the air thermometer 19, the air hygrometer 20, the soil hygrometer 21 and the communications interface 26.

Figure 5:
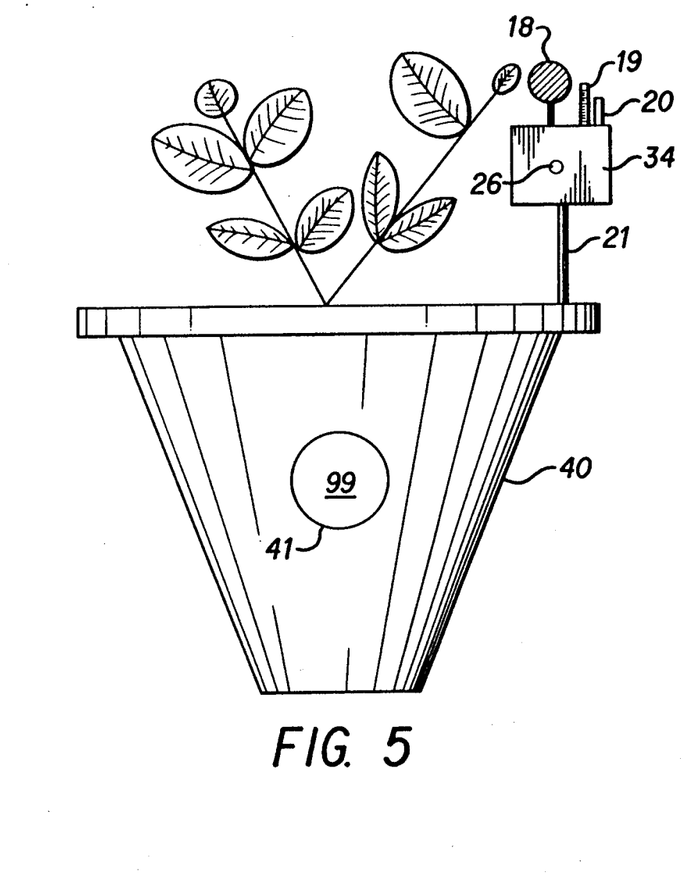
FIG. 5 is a side elevation of the secondary circuit embedded in a potted plant to measure the said plant's microclimatic growth conditions.

FIG. 5 is a side view showing the perspective of the illustrated embodiment of the portable data acquisition device 34, implanted in a potted plant 40 that the user wishes to monitor for microclimatic growth conditions. Also shown is the user plant identifier label 41 attached to the pot 40. This said label is used by the invention to track this plant for optimum growth conditions.

Figure 6:
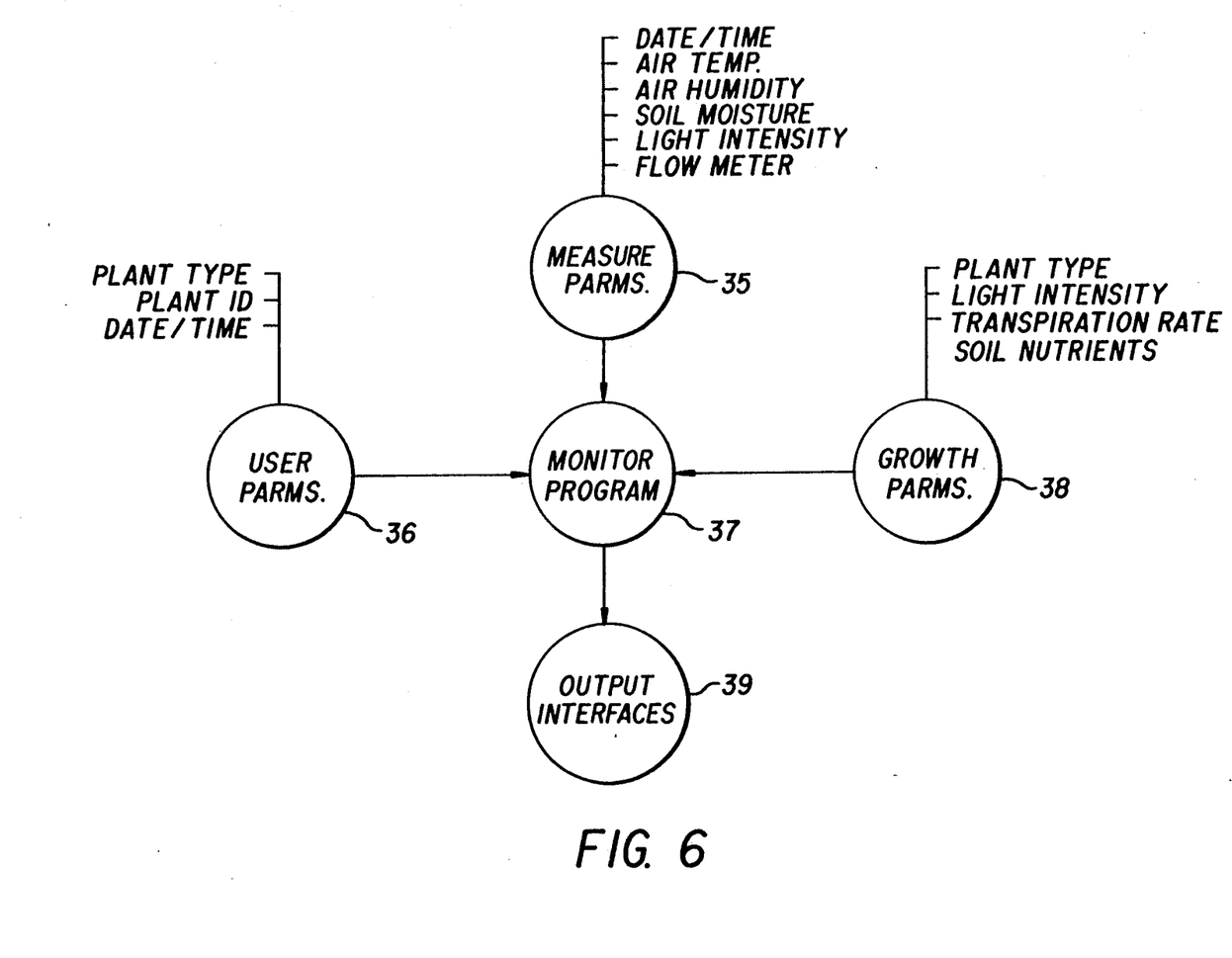
FIG. 6 is a data flow diagram of the main processes that comprise the present embodiment of the invention.

FIG. 6 diagrammatically illustrates the different functional modules of the preferred embodiment of the invention, and the data which is inputted into each respective module. The included modules are:

User Parameters 36 module allows the user to input plant identifier information via the keypad 13 into the invention's current embodiment. This data is used by the invention to correlate measured growth parameters, inputted via the invention's data acquisition circuit 34, with the optimum growth parameters stored in ROM 6. The user entered data includes; the plant type (species), the user selected id 41, which uniquely identifies the location of the plant, and data to reset the primary circuit's clock and calender circuit 3.

Measure Parameters 35 module is responsible for accumulating the following plant growth parameters on the data acquisition circuit 34; time of reading from the clock 24, air temperature from the air thermometer 19, air humidity from the air hygrometer 20, soil moisture content from the soil hygrometer 21, light intensity from the photoelectric cell 18 and the quantity of water that the user applies to a plant, from the flow meter 29 on the primary circuit 33.

Growth Parameters 38 module stores all of the different plant species optimum growth parameters in ROM 6 that the current invention has been programmed to provide plant husbandry services for. This data includes the plant type (species), optimum light intensity levels, the optimum transpiration rate as well as the interval in which nutrients need to be applied to the plant/s under care of the present invention.

Output Interfaces 39 module is responsible for controlling all the user output interaction devices such as the speaker 15, the display unit 14 and the communications interface 11. It is this module that notifies the user as to the suitability of the plant's microclimatic parameters and when the next watering period occurs, by means of the display 14 and the speaker 15.

Figure 7A:
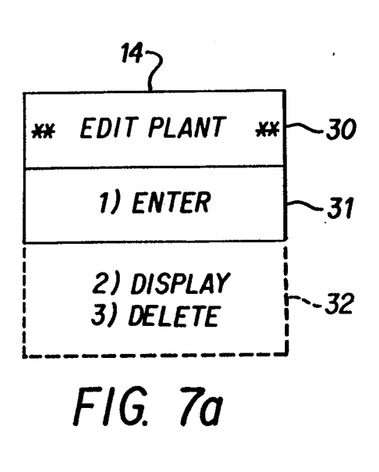
FIGS. 7a, 7b, 7c, 7d, 7e, and 7f are diagrammatic representations of the various system menus generated by the present invention.

FIGS. 7a through 7f illustrate the display 14 when a menu function key of the present invention is selected on the keypad 13—EDIT PLANT, INPUT MEAS., DATE/TIME, PRVS and NEXT. The visible display is subdivided into two lines. The top most line 30 illustrates the type of function key selected. For example if the EDIT PLANT key is selected, then the message ' EDIT PLANT ' is displayed on the top line 30 of the display panel 14 (FIG. 7a). The bottom line 31 and 32 illustrates a menu of available selections for the function displayed on the top line 30 of the display. For example in FIG. 7a, under the EDIT PLANT function, the user is able to;

(1) Enter a new plant into the invention that needs to be monitored for optimum growth.
(2) Display all data pertinent to the user identified plant.
(3) Delete an existing plant from the invention that was being monitored for optimum growth.

Only a single line of a menu's available selection is displayed, namely line 31. In the preferred embodiment of the invention, the user has to use scroll keys NEXT or PRVS, on the keypad 13 to access the hidden menu selections 32. The hidden menu item are illustrated in FIGS. 7a through 7f by means of a broken line. The NEXT key allows the user to scroll forward and the PRVS key enables the user to scroll backwards through the available hidden menu items. For example in FIG. 7a, if the user presses the NEXT key twice, the display's bottom line 31 would contain '(3) Delete'. If the user now presses the PRVS key once, the bottom line of the display 31 would contain '(2) Display'. Throughout the menu selection scrolling process the top line 30 of the display 14 remains static and unchanged—for example in FIG. 7a, the top line 30 would continuously display ' EDIT PLANT ' whilst the user scrolled through the available menu selections displayed on the bottom line 31. To execute a currently displayed menu item, the user presses the ENTER key on the keypad 13.

FIG. 7a illustrates the display 14 when the EDIT PLANT function key is selected on the keypad 13. When the user has selected the appropriate menu function, the current invention prompts the user, via the display 14, to enter pertinent data relating to the selected menu item. An example of this said data is illustrated in FIG. 7d.

The EDIT PLANT menu selection '(1) Enter' allows the user to enter into the present invention a new plant to be cared for. The user enters a unique plant id and the plant species (see FIG. 7d).

The EDIT PLANT menu selection '(2) Display' allows the user to view all pertinent growth parameters for an already uniquely identified entered plant that the present invention is caring for. The user enters a unique plant id 41 or is able to scroll through the existing list of plants that the system is caring for.

The EDIT PLANT menu selection '(3) Delete' allows the user to delete from the present invention an existing plant that is currently being cared for. The user enters a unique plant id 41 or is able to scroll through the existing list of plants already in the system. Refer to FIG. 7e for more details.

Figure 7B:
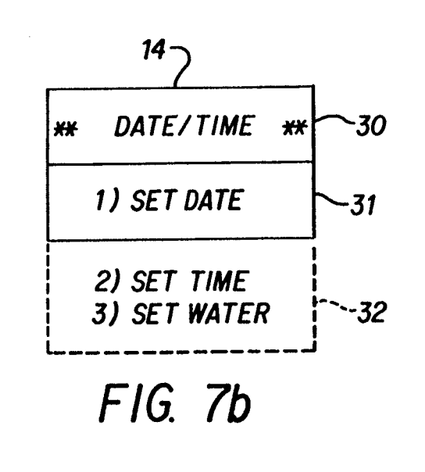

FIG. 7b illustrates the display 14 when the DATE/TIME function key is selected on the keypad 13. When the user has selected the appropriate menu function, the current invention prompts the user, via the display 14, to enter pertinent data relating to the selected menu item. An example of this said data is illustrated in FIG. 7f.

The DATE/TIME menu selection '(1) Set date' enables the user to set the current date in the invention's clock and calender circuit 3.

The DATE/TIME menu selection '(2) Set time' enables the user to set the current time in the invention's clock and calender circuit 3.

The DATE/TIME menu selection '(3) Set water' enables the user to set the day of week and the time during that day, that the user wishes to be notified of any plants to be watered. This allows the user the convenience of watering multiple plants that are closely spaced for their watering requirements. Furthermore by setting the time during the day at which the user is normally available to respond to the invention's 'water plant' notification. This ensures prompt user response and avoids the current invention in excessively sounding the audible alarm on the speaker 15, thereby draining the power of the system. For further details refer to FIG. 7f.

Figure 7C:
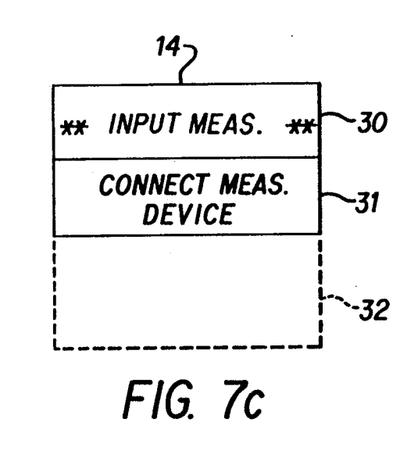
Figure 7D:
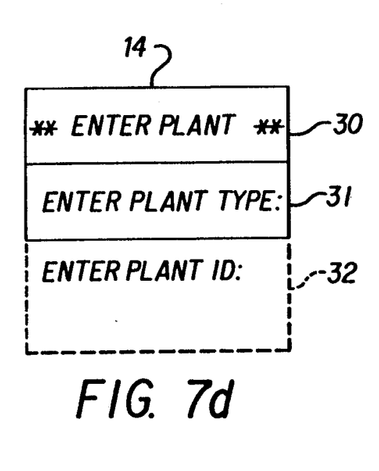
Figure 7E:
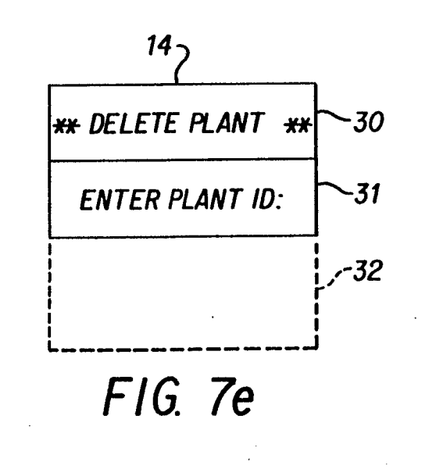
Figure 7F:
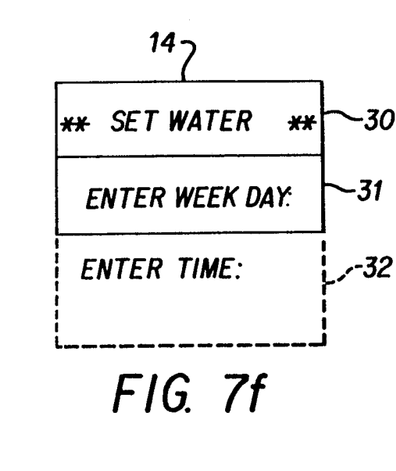

FIG. 7c illustrates the display 14 when the INPUT MEAS. function key is selected on the keypad 13. This function key is used to notify the system that the remote data acquisition device's communications interface 26 has been physically connected to the primary circuit's communication's interface 11, and is consequently ready to download monitored plant growth data from the invention's remote data acquisition device's RAM 28 into the primary circuit's RAM 8. The display's bottom line 31 notifies the user if the system is ready to download the aforementioned data, or whether a communication's problem was experienced which is preventing data transfer.

FIG. 7d illustrates the display 14 when the EDIT PLANT function key is selected on the keypad 13 and when the '(1) Enter' menu item is selected by the user. The display's bottom line 31 initially prompts the user to enter the plant type (species). The User Parameters 36 program in ROM 6 verifies whether or not the user entered species is available in the current system for plant husbandry. The current embodiment of the invention supplies the user with a non-electronic cross reference table that translates the name of a plant species into a numeric code that is used the Growth Parameters 38 program. To those versed in the art of microprocessor control systems, it is obvious that the invention couls as easily provide electronically the aforementioned cross reference lookup table. When a valid plant species numeric code has been entered via the keypad 13, the present invention's embodiment prompts the user on the display's bottom line 31 to enter a unique plant identifier 41. The user defined plant id 41 is verified by the User Parameters 36 program to be unique. This said plant id 41 is the means by which the user knows which plant the invention is relating growth information to the user about. This plant id 41 needs to be attached to the said plant by means of a label (see FIG. 5).

FIG. 7e illustrates the display 14 when the EDIT PLANT function key is selected on the keypad 13 and when the '(3) Delete' menu item is selected by the user. The display's bottom line 31 prompts the user on the display's bottom line 31 to enter the unique plant identifier 41 of the plant that the user wishes to remove from the husbandry monitoring system. The user entered plant id 41 is verified by the User Parameters 36 program to be valid, i.e. the said plant exists in the system. Once verification is in the affirmative, the Delete Program, stored in ROM 6 removes all the growth data and plant identifier data from RAM 8. Thus the invention discontinues plant husbandry functions for the said plant.

FIG. 7f illustrates the display 14 when the DATE/TIME function key is selected on the keypad 13 and when the '(3) Set water' menu item is selected by the user for any plant id 41. This selection enables the user to set a convenient watering time. At the said present time the invention will notify the user if the plant being considered requires watering, or other growth care. If the considered plant's required watering period is weekly, which is the case for most indoor plants, then the display's bottom line 31 prompt's the user on the display's bottom line 31 to enter, firstly the day of the week and secondly the time on the user specified week day, that will be convenient to the user to water the said plant. Further the current embodiment of the invention will group as many plants together such that the user will only have to do a single round of watering plants under the invention's care. This water grouping function of the said plant is done initially automatically if the invention finds that the calculated watering period falls on the same date as another plant.

The invention being thus described, it will be obvious that the same may be varied in a multiplicity of ways. Such variations are not to be regarded as a departure from the spirit and scope of the invention, and all such modifications are intended to be included within the scope of the following claims.

What is claimed is:

1. A method of providing growth care for a wide variety of plants comprising the steps of;
   (a) providing a computing device having time keeping circuitry, programmable circuitry, program accessible memory, output display means, and data entry input means,
   (b) storing optimum plant growth parameters for each of said varieties of plants in said program accessible memory,
   (c) providing said programmable circuitry with a program capable of (i) taking input data regarding a specific one of said varieties, (ii) comparing this data with the said stored parameters and (iii) producing an output responsive to said comparison, said method further including the steps of,
   (d) providing an input device capable of measuring important plant growth parameters of each said varieties and inputting said measurements to said computing device,
   (e) placing said input device in a location proximate to one of said plant varieties for a period of time sufficient for said device to measure the growing conditions of said plant variety, and
   (f) inputting the information from said input device to said computing device to produce said output responsive to said comparison.

2. A method as in claim 1 comprising the step of assigning to each one of said varieties of plants a unique identification code, which is stored in the said computing device, such that said response is uniquely associated with said identification code.

3. A method as in claim 2 comprising the steps of retrieving and editing said identification code in said program accessible memory.

4. A method as in claim 2 comprising the said steps of retrieving and deleting said identification code from said program accessible memory, thereby terminating said growth care for said identified variety.

5. A method as in claim 1 wherein said response is a signal indicating the range of light that said variety is receiving.

6. A method as in claim 1 wherein said response is a signal indicating the range of ambient temperatures that said variety is receiving.

7. A method as in claim 1 wherein said response is a signal indicating the soil moisture that said variety is receiving.

8. A method as in claim 1 wherein said response is a signal indicating the air humidity that said variety is receiving.

9. A method as in claim 1 wherein said response is a signal indicating the soil nutrients that said variety is receiving.

10. A method as in claim 1 wherein said response is a signal indicating when it is time to water said variety.

11. A method as in claim 10 wherein said response is a signal indicating the quantity of water that said variety is to receive.

12. A method as in claim 1 wherein said response is a signal indicating the soil nutrients required to be added to said variety.

13. A method as in claim 1 comprising the step wherein said output response can be set to a specific time by said input means.

* * * * *